(12) United States Patent
Surin et al.

(10) Patent No.: US 12,146,613 B2
(45) Date of Patent: Nov. 19, 2024

(54) UNIVERSAL CAMERA MOUNT

(71) Applicant: Crestron Electronics, Inc., Rockleigh, NJ (US)

(72) Inventors: Davin Surin, Allston, MA (US); Howard Balch, Bloomingdale, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

(21) Appl. No.: 18/096,295

(22) Filed: Jan. 12, 2023

(65) Prior Publication Data
US 2024/0240750 A1    Jul. 18, 2024

(51) Int. Cl.
*F16M 13/02*    (2006.01)
*F16M 11/22*    (2006.01)
*G03B 17/56*    (2021.01)

(52) U.S. Cl.
CPC .......... *F16M 13/022* (2013.01); *F16M 11/22* (2013.01); *F16M 13/027* (2013.01); *G03B 17/561* (2013.01)

(58) Field of Classification Search
CPC .... G03B 17/561; G03B 17/566; F16M 13/02; F16M 13/022; F16M 13/027; F16M 11/22
USPC ...................................................... 248/309.1
See application file for complete search history.

(56) References Cited

U.S. PATENT DOCUMENTS

| | | | | |
|---|---|---|---|---|
| 4,051,362 A | * | 9/1977 | Guggemos | F21V 21/02 362/432 |
| 4,319,825 A | * | 3/1982 | Newton | G03B 17/561 396/428 |
| 4,651,144 A | * | 3/1987 | Pagano | G08B 13/19619 340/693.8 |
| 4,709,897 A | * | 12/1987 | Mooney | F16M 13/00 70/DIG. 49 |

(Continued)

FOREIGN PATENT DOCUMENTS

| | | | | |
|---|---|---|---|---|
| CN | 110319327 A | * | 10/2019 | F16M 11/04 |
| CN | 112539316 A | * | 3/2021 | F16M 11/04 |

(Continued)

OTHER PUBLICATIONS

SCT_RCS-EE4, "EE-IV Ceiling Mount Sheetrock", Dwg. No. ECN-1068-EE01-CSR-PEE4Web, Sound Control Technologies, Norwalk, CT, www.soundcontrol.net.

(Continued)

*Primary Examiner* — Taylor Morris
(74) *Attorney, Agent, or Firm* — Crestron Electronics, Inc.

(57) ABSTRACT

A bracket mounts a device to any of plural surfaces at any of a plural orientations. A platform part has a mounting surface to support the device. An end part is located at one end of the platform part. The end part has openings to receive threaded screws by which the end part is fastened to a first external surface when in a first orientation. The mounting surface has openings to receive threaded screws by which the platform part is alternatively fastened to a (Continued)

second external surface when in a second orientation. A guide slot in the mounting surface has an open end that faces away from the end part. The guide slot, when the bracket is in the second orientation, receives through the open end a knob secured to the device, guides the knob as the device is moved, and retains the knob to hold the device.

21 Claims, 14 Drawing Sheets

(56) References Cited

U.S. PATENT DOCUMENTS

| | | | |
|---|---|---|---|
| 5,455,625 A * | 10/1995 | Englander | F16M 11/048 |
| | | | 348/E5.025 |
| 5,485,237 A | 1/1996 | Adermann | |
| 5,790,910 A * | 8/1998 | Haskin | F16M 13/02 |
| | | | 396/428 |
| 6,015,123 A * | 1/2000 | Perez | F16M 13/025 |
| | | | 248/220.21 |
| 6,268,882 B1 | 7/2001 | Elberbaum | |
| 6,587,152 B1 | 7/2003 | Sharp et al. | |
| RE38,967 E * | 2/2006 | Kreuzer | B60R 25/305 |
| | | | 348/148 |
| 7,038,709 B1 * | 5/2006 | Verghese | F16M 11/10 |
| | | | 348/208.1 |
| 7,124,656 B2 * | 10/2006 | Miller | F16M 11/08 |
| | | | 74/5.1 |
| 7,156,359 B2 | 1/2007 | Dittmer et al. | |
| 7,281,867 B2 * | 10/2007 | Takahashi | F16M 11/10 |
| | | | 348/143 |
| 7,594,632 B2 * | 9/2009 | Van Den Bossche | |
| | | | H05K 5/0204 |
| | | | 248/475.1 |
| 7,614,804 B2 * | 11/2009 | Kim | G03B 37/06 |
| | | | 348/373 |
| 7,883,065 B2 | 2/2011 | Nelson | |
| 8,138,469 B2 | 3/2012 | Dittmer et al. | |
| 8,172,435 B2 | 5/2012 | Spiro et al. | |
| 8,404,971 B1 * | 3/2013 | Gretz | H02G 3/123 |
| | | | 174/53 |
| 8,526,802 B1 * | 9/2013 | Starns | G03B 15/02 |
| | | | 396/428 |
| 8,708,583 B2 | 4/2014 | Chamberlayne | |
| 8,821,045 B1 | 9/2014 | De Pape et al. | |
| 9,004,785 B1 * | 4/2015 | Mohan | G03B 17/561 |
| | | | 348/143 |
| 9,075,290 B1 * | 7/2015 | Thieman | F16M 13/022 |
| 9,250,500 B2 * | 2/2016 | Celler | F16M 11/2057 |
| 9,294,839 B2 | 3/2016 | Lambert et al. | |
| 9,316,888 B1 * | 4/2016 | Niemackl | G03B 29/00 |
| 9,328,882 B2 | 5/2016 | Spiro et al. | |
| 9,594,294 B2 * | 3/2017 | Linden | G08B 13/19632 |
| 9,813,806 B2 | 11/2017 | Graham et al. | |
| 9,823,551 B2 * | 11/2017 | Adervall | H04N 23/51 |
| 9,838,578 B2 | 12/2017 | Huang | |
| 9,942,637 B2 * | 4/2018 | Moro | H04R 1/026 |
| 9,982,832 B1 * | 5/2018 | Nicolas | F16M 11/2014 |
| 9,992,389 B1 | 6/2018 | Fu et al. | |
| 10,401,714 B2 * | 9/2019 | Aiello | G03B 17/561 |
| 10,492,314 B2 * | 11/2019 | Svedberg | H04N 7/18 |
| 10,728,653 B2 | 7/2020 | Graham et al. | |
| 10,775,683 B1 * | 9/2020 | Hallett | F16M 11/24 |
| 10,844,997 B1 * | 11/2020 | Loew | F16M 13/00 |
| 10,861,303 B2 * | 12/2020 | Mehdi | H04N 23/50 |
| 10,995,903 B1 | 5/2021 | Watts | |
| 2007/0058065 A1 * | 3/2007 | Saiki | H04N 23/51 |
| | | | 348/E5.026 |
| 2008/0226282 A1 * | 9/2008 | Takahashi | F16M 13/027 |
| | | | 396/427 |
| 2011/0304732 A1 | 12/2011 | Uchida et al. | |
| 2012/0288267 A1 * | 11/2012 | Cuddeback | G03B 17/561 |
| | | | 396/428 |
| 2013/0327912 A1 * | 12/2013 | Yoshida | F16M 13/022 |
| | | | 248/289.11 |
| 2015/0198871 A1 * | 7/2015 | Piraino | F16M 13/02 |
| | | | 248/309.1 |
| 2016/0373844 A1 * | 12/2016 | Owens | H04R 1/028 |
| 2018/0120672 A1 * | 5/2018 | Huang | G03B 17/02 |
| 2018/0360216 A1 * | 12/2018 | Loether | A47B 97/001 |
| 2021/0278753 A1 | 9/2021 | Sodergard et al. | |
| 2021/0278755 A1 * | 9/2021 | Boyes | F16M 13/02 |
| 2023/0213843 A1 * | 7/2023 | Homem | H04N 23/51 |
| | | | 396/428 |
| 2024/0241431 A1 * | 7/2024 | Surin | F16M 13/022 |

FOREIGN PATENT DOCUMENTS

| | | | | | |
|---|---|---|---|---|---|
| DE | 202004010992 U1 * | 12/2005 | | G03B 17/561 |
| KR | 200153711 Y1 * | 8/1999 | | H04N 7/18 |
| KR | 200299578 Y1 * | 12/2002 | | |
| KR | 200395901 Y1 * | 9/2005 | | G03B 21/54 |
| KR | 20170142404 A * | 12/2017 | | H04N 7/18 |
| KR | 20190051494 A * | 5/2019 | | G03B 13/02 |

OTHER PUBLICATIONS

Notice of References Cited (PTO-892), U.S. Appl. No. 18/107,128, U.S. Patent and Trademark Office, Jun. 11, 2024.

* cited by examiner

UNIVERSAL CAMERA MOUNT

BACKGROUND OF THE INVENTION

Technical Field

The present embodiments relate to a camera mount and, more particularly, to a camera mount that is can be affixed to either a wall or a ceiling and upon which a camera may be mounted in either an upright or an inverted orientation.

Background Art

In recent years, it has become more common to hold meetings in which one or more of the participants participates from a location other than the meeting room. Similarly, lectures and conferences where one or more of the attendees are located away from the conference room have become more frequent. To enable a remote participant to view the meeting or conference, one or more video cameras are employed that are used for video conferencing via an app such as Teams or Zoom. Such cameras may also be employed to record the meeting, lecture, or conference for subsequent replay.

To provide remote participants with an experience more closely resembling actually being present in the room, intelligent video camera tracking may be employed. Intelligent video camera tracking automatically tracks a presenter and follows the presenter as the person moves around the room. Intelligent video camera tracking may also automatically pan, tilt and/or zoom camera to frame the other participants in the room. Additionally, such tracking may be used or to track persons speaking to the presenter. To provide such tracking, multiple cameras may be installed in the meeting or conference room and may be arranged in various configurations.

Typically, the camera is mounted according to one of several possible arrangements: (a) mounted to a wall with the camera upright, (b) mounted to a wall with the camera inverted, or (c) mounted to a ceiling with the camera inverted. Currently, each of these different camera configurations employs a camera mount specific to that configuration. That is, one type of camera mount may be needed when mounting the camera to a wall with the camera positioned upright, another type of camera mount is may be employed when mounting the camera to a wall with the camera inverted, and yet another type of camera mount may be utilized when mounting the camera to a ceiling with the camera inverted. As a result, the installers of cameras for such conference rooms must purchase and stock several different types of cameras mounts, increasing the cost of installation.

It is therefore desirable to provide a single camera mount that can be utilized regardless of whether the camera is to be mounted to a wall or ceiling. It is further desirable to provide a single camera mount that can be employed regardless of the orientation at which the camera is to be mounted.

SUMMARY OF THE INVENTION

It is to be understood that both the general and detailed descriptions that follow are exemplary and explanatory only and are not restrictive.

DISCLOSURE OF INVENTION

In accordance with an aspect, a bracket mounts a device to any of a plurality of surfaces at any of a plurality of orientations. The bracket comprises: (a) a platform part having a mounting surface configured to support the device; (b) an end part located at one end of the platform part, the end part having a plurality of openings configured to receive threaded screws by which the end part is fastened to a first external surface when the bracket is in a first orientation; (c) the mounting surface of the platform part having a plurality of openings configured to receive threaded screws by which the platform part is alternatively fastened to a second external surface when the bracket is in a second orientation; and (d) a guide slot formed in the mounting surface of the platform part, the guide slot having an open end that faces away from the end part, the guide slot being configured to, when the bracket is in the second orientation, receive through the open end a knob secured to the device, then guide the knob along the guide slot as the device is moved toward the end part, and thereafter retain the knob and thereby hold the device.

According to a further aspect, a camera mount mounts a camera to any of a plurality of surfaces at any of a plurality of orientations. The camera mount comprises: (a) a platform part having a mounting surface configured to support the camera; (b) an end part located at one end of the platform part, the end part having a plurality of openings configured to receive threaded screws by which the end part is fastened to a first external surface when the camera mount is in a first orientation; (c) the mounting surface of the platform part having a plurality of openings configured to receive threaded screws by which the platform part is alternatively fastened to a second external surface when the camera mount is in a second orientation; and (d) a guide slot formed in the mounting surface of the platform part, the guide slot having an open end that faces away from the end part, the guide slot being configured to, when the camera mount is in the second orientation, receive through the open end a knob secured to the camera, then guide the knob along the guide slot as the camera is moved toward the end part, and thereafter retain the knob and thereby hold the camera According to another aspect, a camera mount mounts a camera to a wall or a ceiling at an upright or an inverted orientation. The camera mount comprises: (a) a platform part having a mounting surface configured to support the camera; (b) an enclosure part located at one end of the platform part and enclosing a portion of the platform part, the enclosure part having a shape that conforms to a shape of a base portion of the camera, the enclosure part having a plurality of openings an end portion of the enclosure part that are configured to receive threaded screws by which the end portion is fastened to the wall when the camera mount is in the upright orientation; (c) the platform part including a further surface having a further opening configured to receive a further threaded screw by which, when the camera mount is in the upright orientation, the camera is secured to the platform part; (d) the mounting surface of the platform part having a plurality of openings that are configured to receive threaded screws by which the platform part is alternatively fastened to the ceiling when the camera mount is in the inverted orientation; (e) a guide slot formed in the mounting surface of the platform part, the guide slot having an open end that faces away from the enclosure part, the guide slot being configured to, when the camera mount is in the inverted orientation, receive through the open end a knob secured to the camera, then guide the knob along the guide slot as the camera is moved toward the enclosure part, and thereafter retain the knob and thereby hold the camera; and (f) an end plate affixable to an end of the enclosure part; (g) wherein (1) the enclosure part is further configured to be fastened to the wall when the camera mount is in the inverted orientation, without the platform part being fastened to the ceiling, the openings in the enclosure part of the camera mount receiving the threaded screws by which the enclosure part is fastened to the wall, (2) the guide slot of the platform part receives, guides and retains the knob secured to the camera in a same manner as when the platform part is fastened to the ceiling.

BRIEF DESCRIPTION OF DRAWINGS

The accompanying figures further illustrate the present embodiments.

The components in the drawings are not necessarily drawn to scale, emphasis instead being placed upon clearly illustrating the principles of the present embodiments. In the drawings, like reference numerals designate corresponding parts throughout the several views.

BRIEF DESCRIPTION OF THE SEVERAL VIEWS OF THE DRAWING

Figure 1:
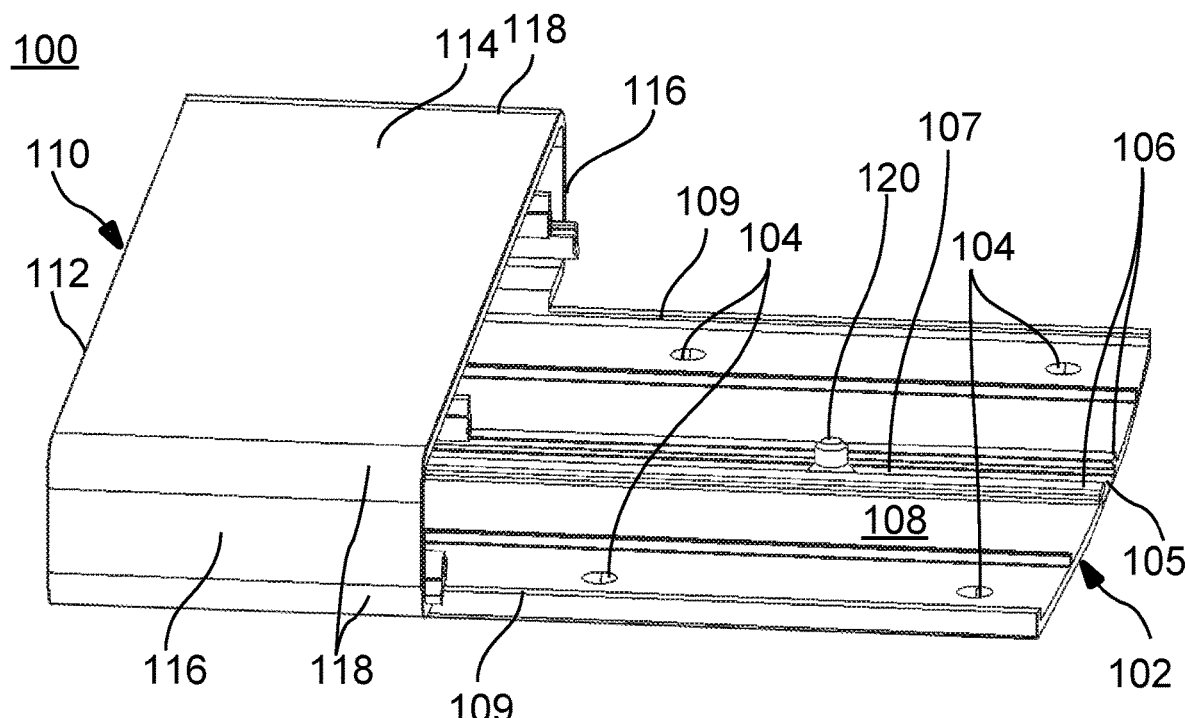

FIG. 1 is a perspective view of a camera mount in accordance with an embodiment.

Figure 2:
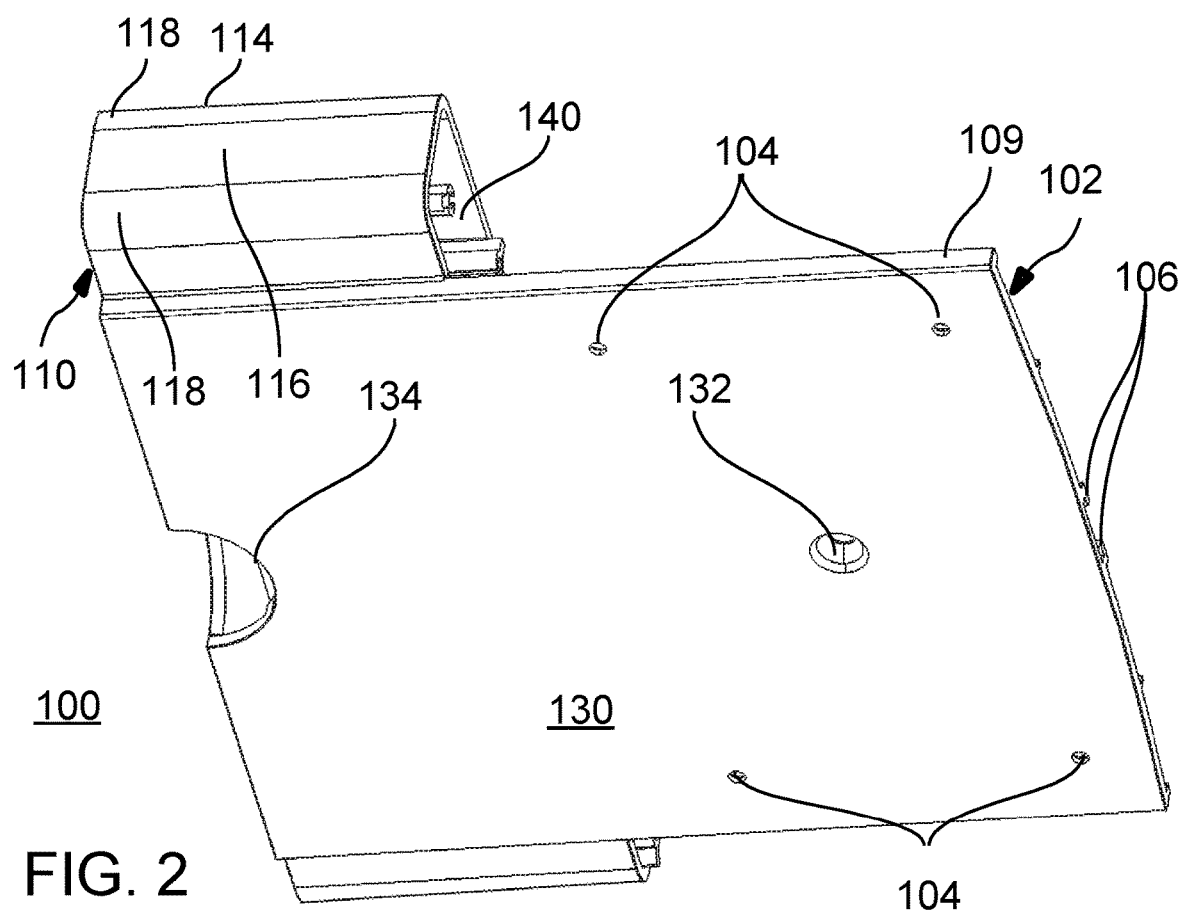

FIG. 2 is another perspective view of the camera mount of FIG. 1.

Figure 3:
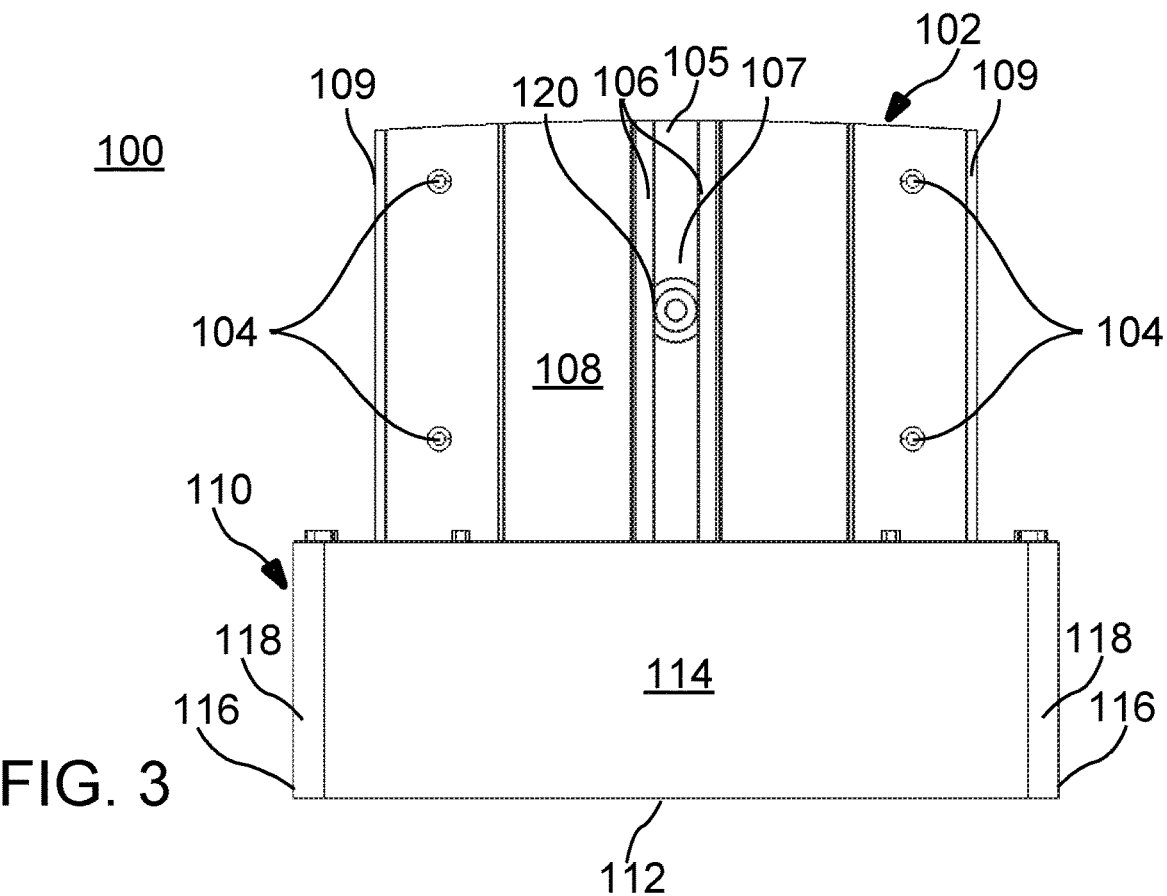

FIG. 3 is a plan view of the camera mount of FIG. 1.

Figure 4:
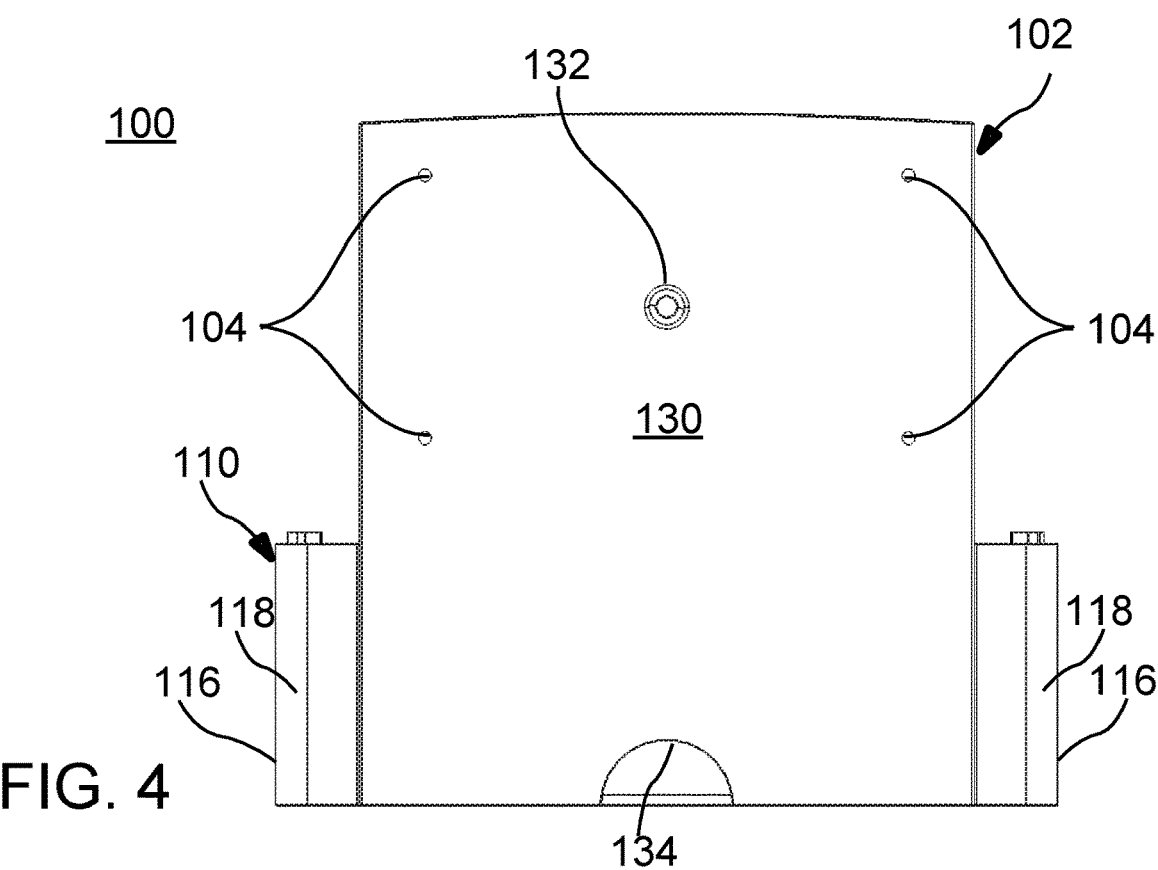

FIG. 4 is another plan view of the camera mount of FIG. 1.

Figure 5:
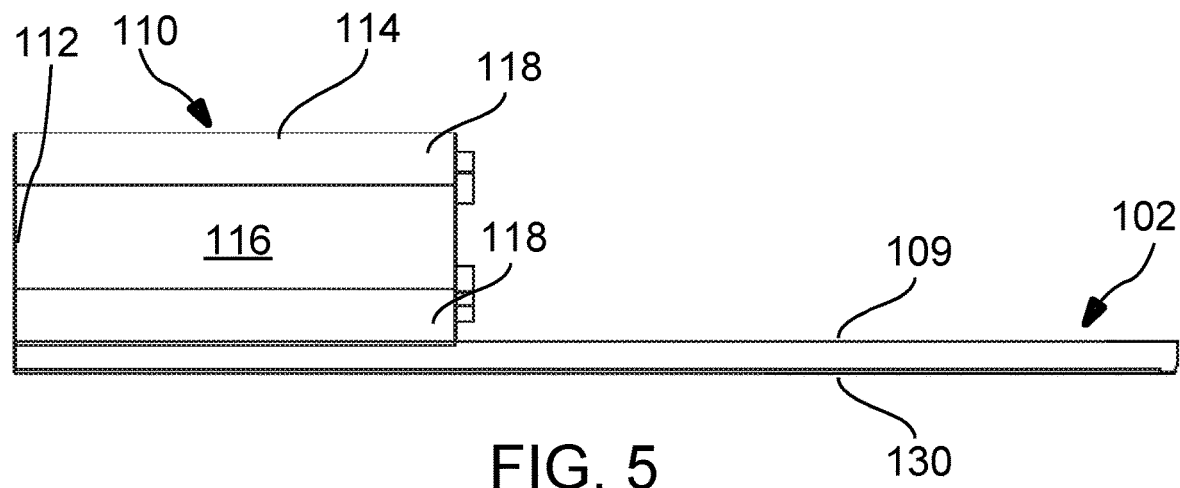
Figure 6:
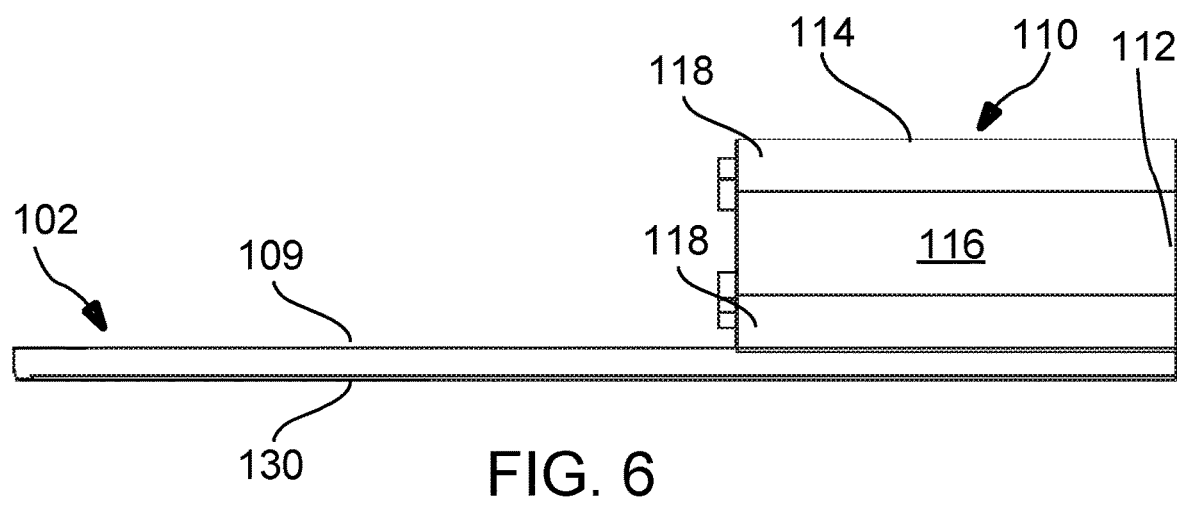

FIGS. 5 and 6 are side elevation views of the camera mount of FIG. 1.

Figure 7:
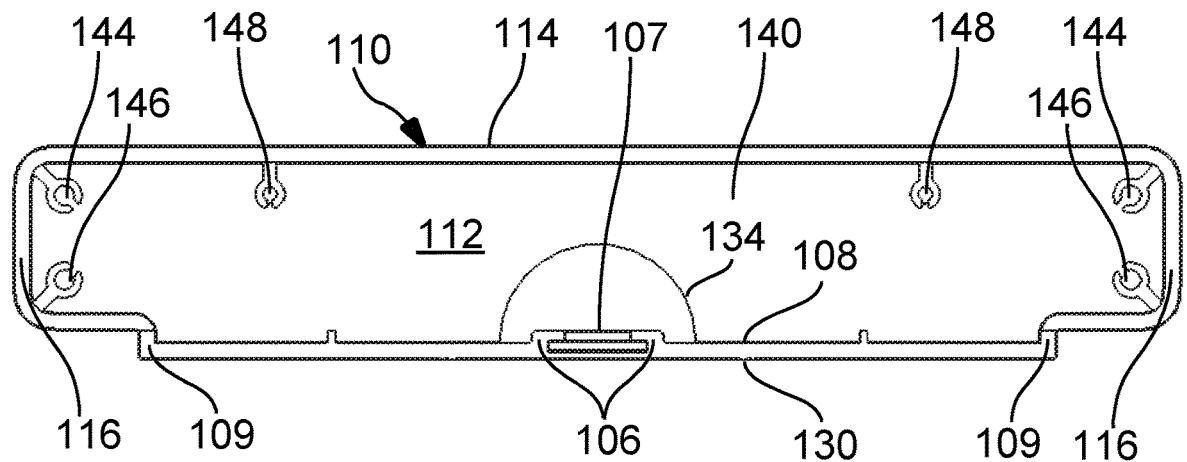

FIG. 7 is a front elevation view of the camera mount of FIG. 1.

Figure 8:
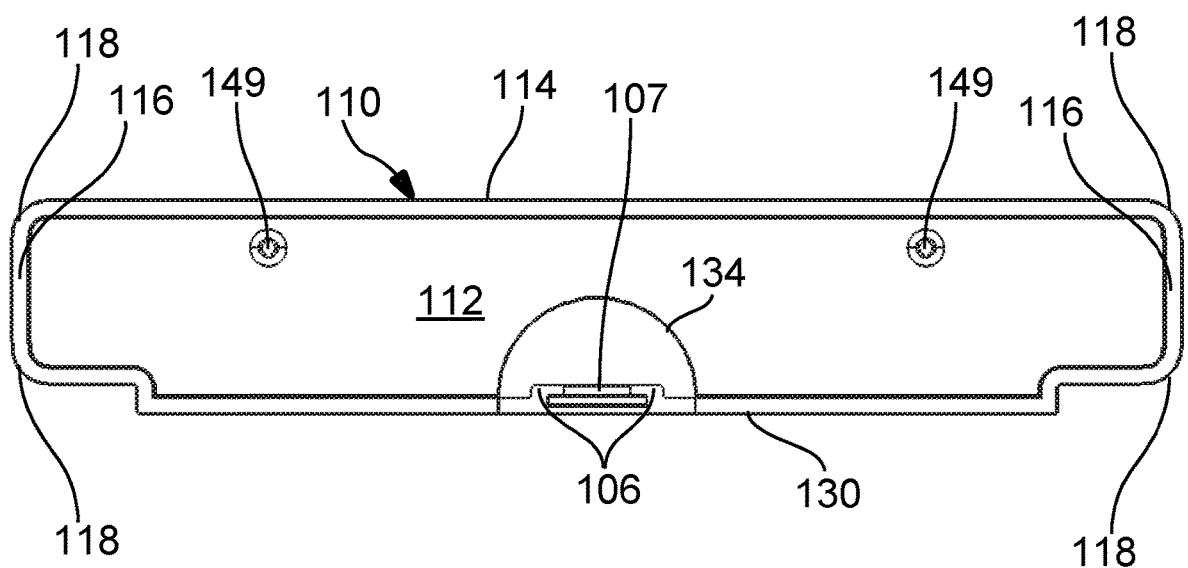

FIG. 8 is a rear elevation view of the camera mount of FIG. 1.

Figure 9:
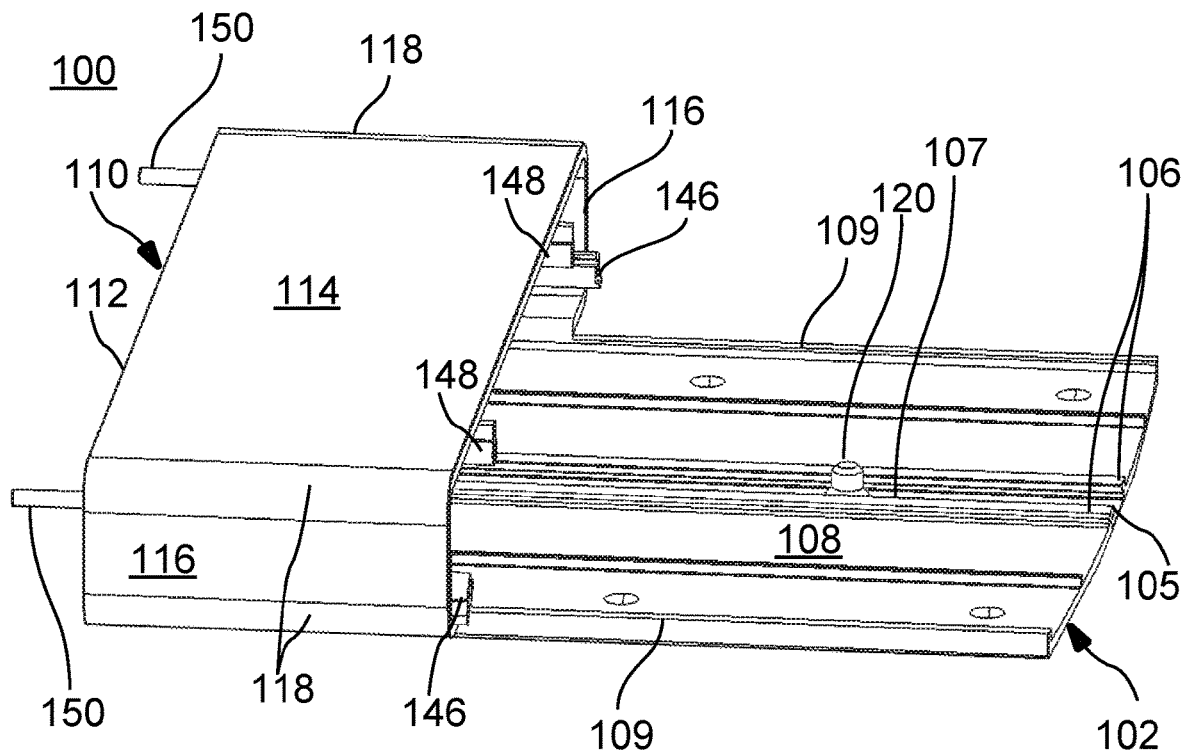

FIG. 9 is a perspective view of the camera mount of FIG. 1 when affixed to a wall in an upright orientation.

Figure 10:
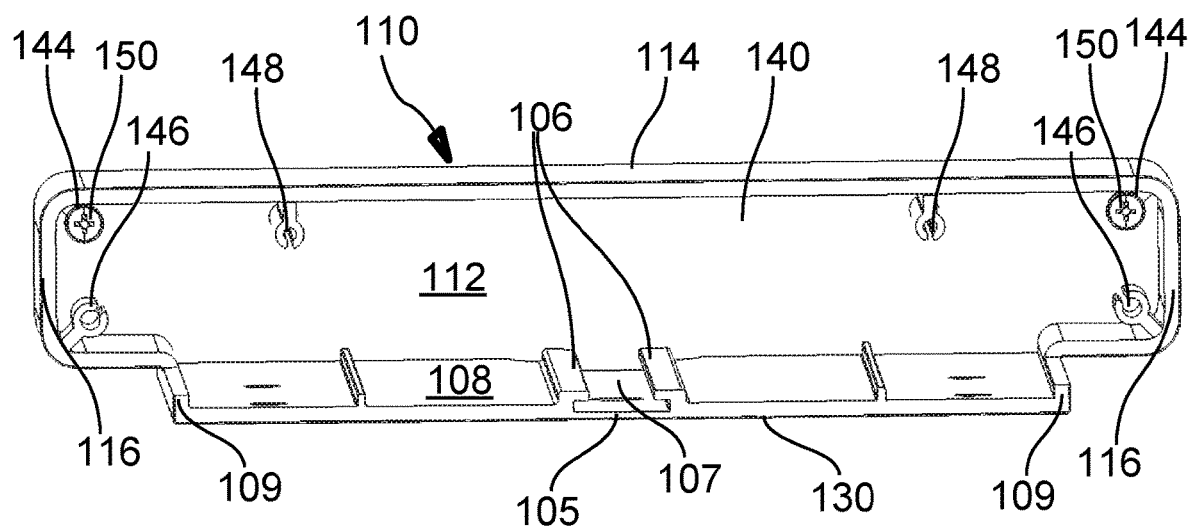

FIG. 10 is a frontal perspective view of the camera mount of FIG. 9.

Figure 11:
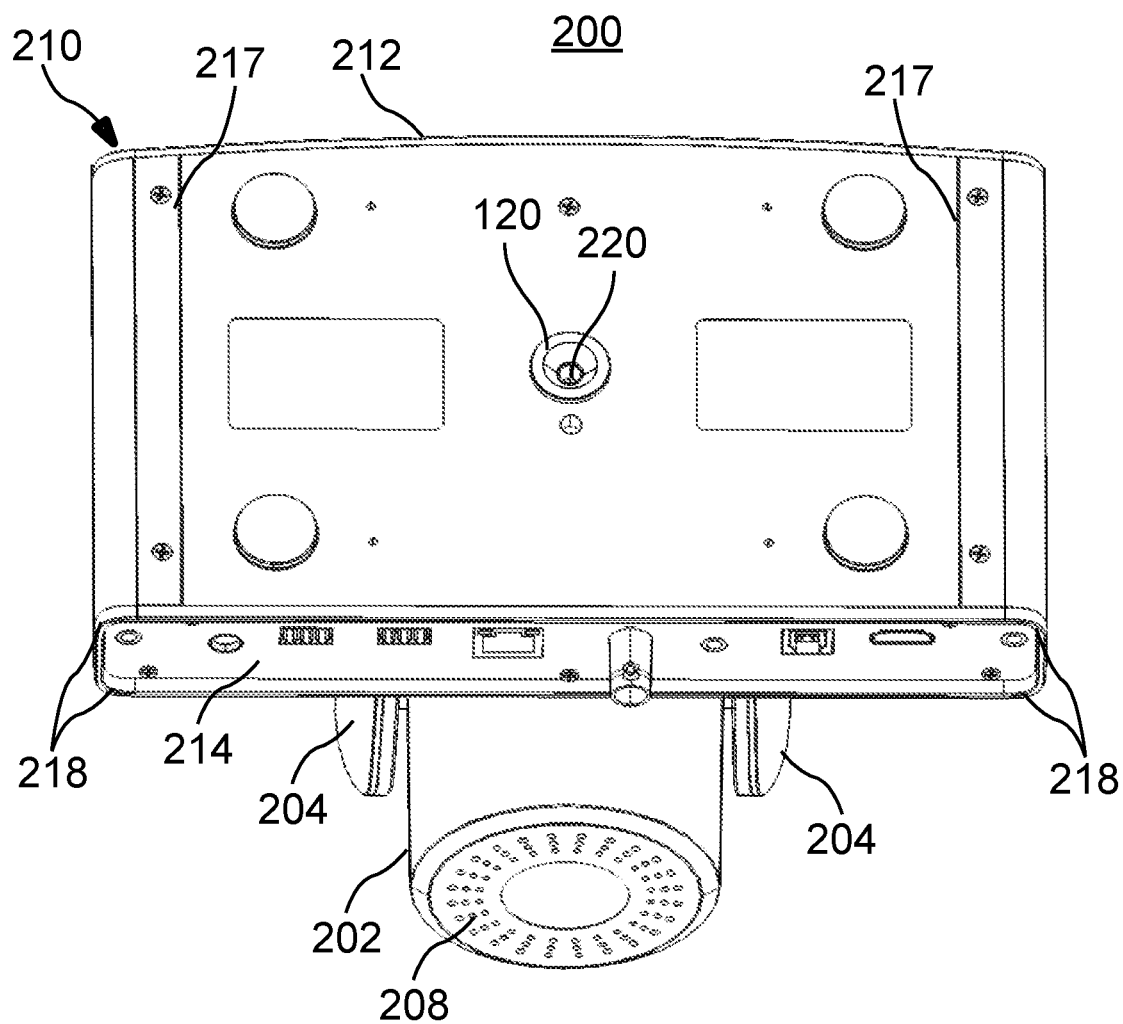

FIG. 11 is a bottom perspective view of a known camera.

Figure 12:
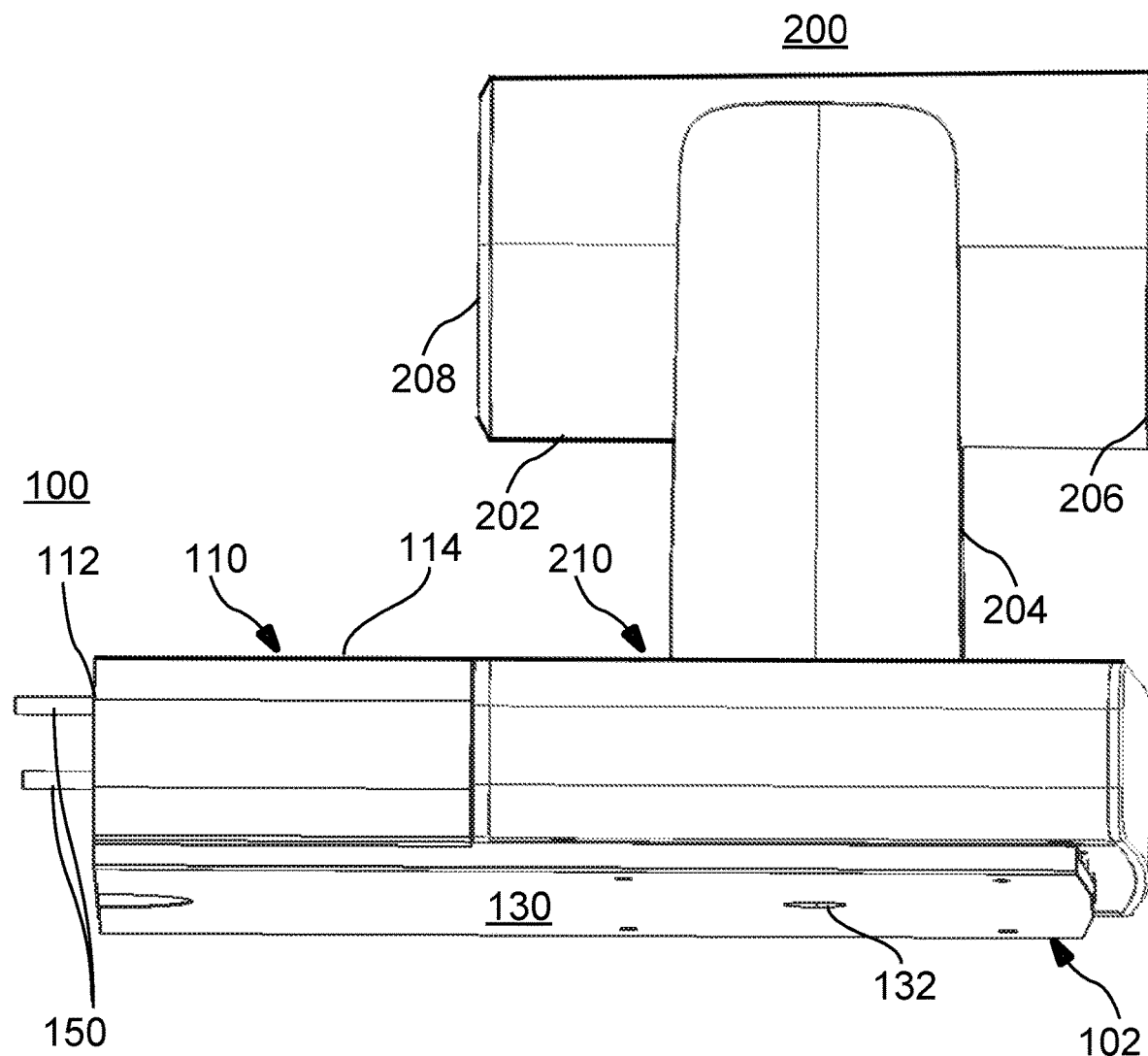
Figure 13:
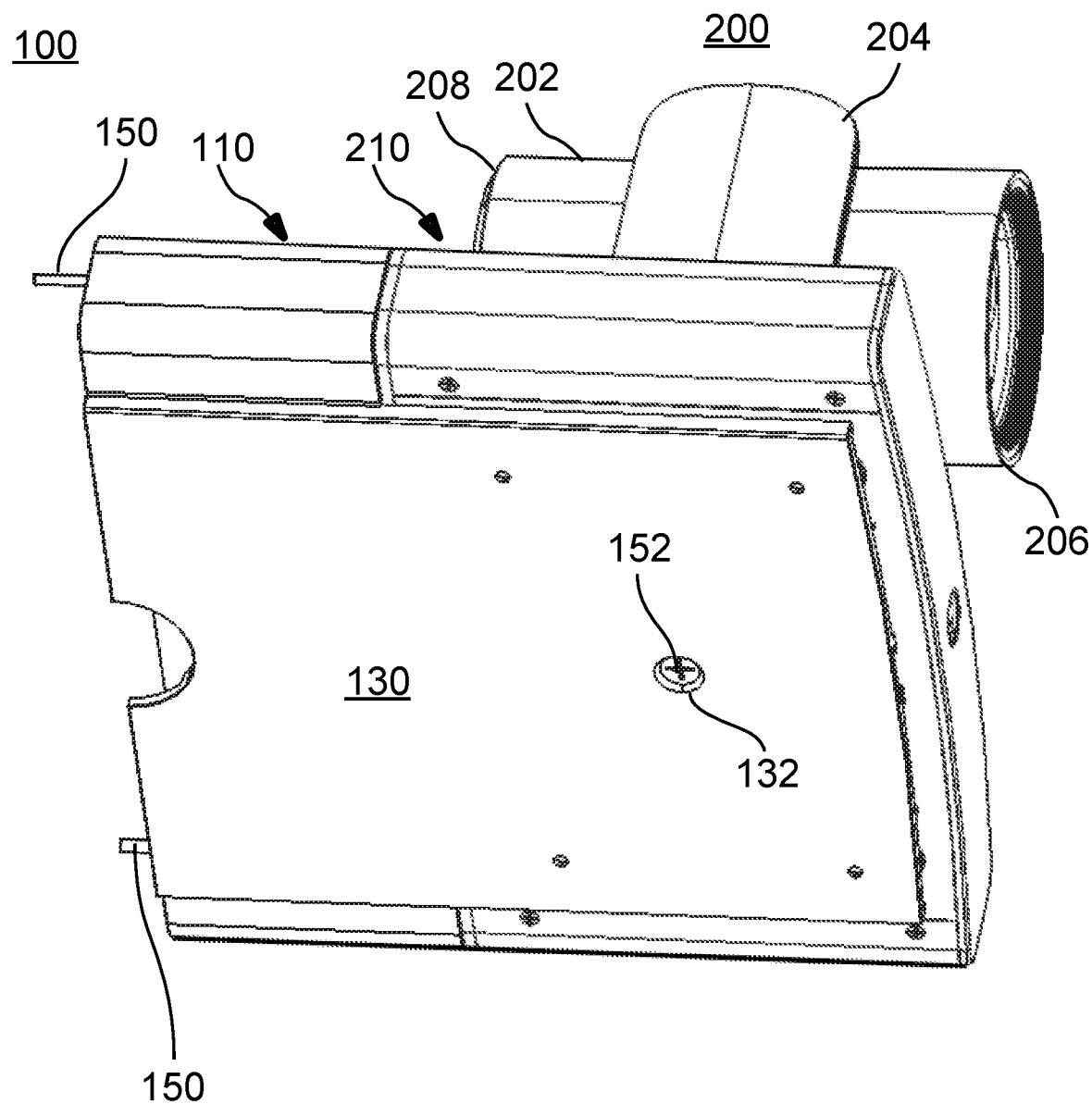

FIGS. 12 and 13 are perspective views of the camera mount of FIG. 9 with a known camera mounted thereon.

Figure 14:
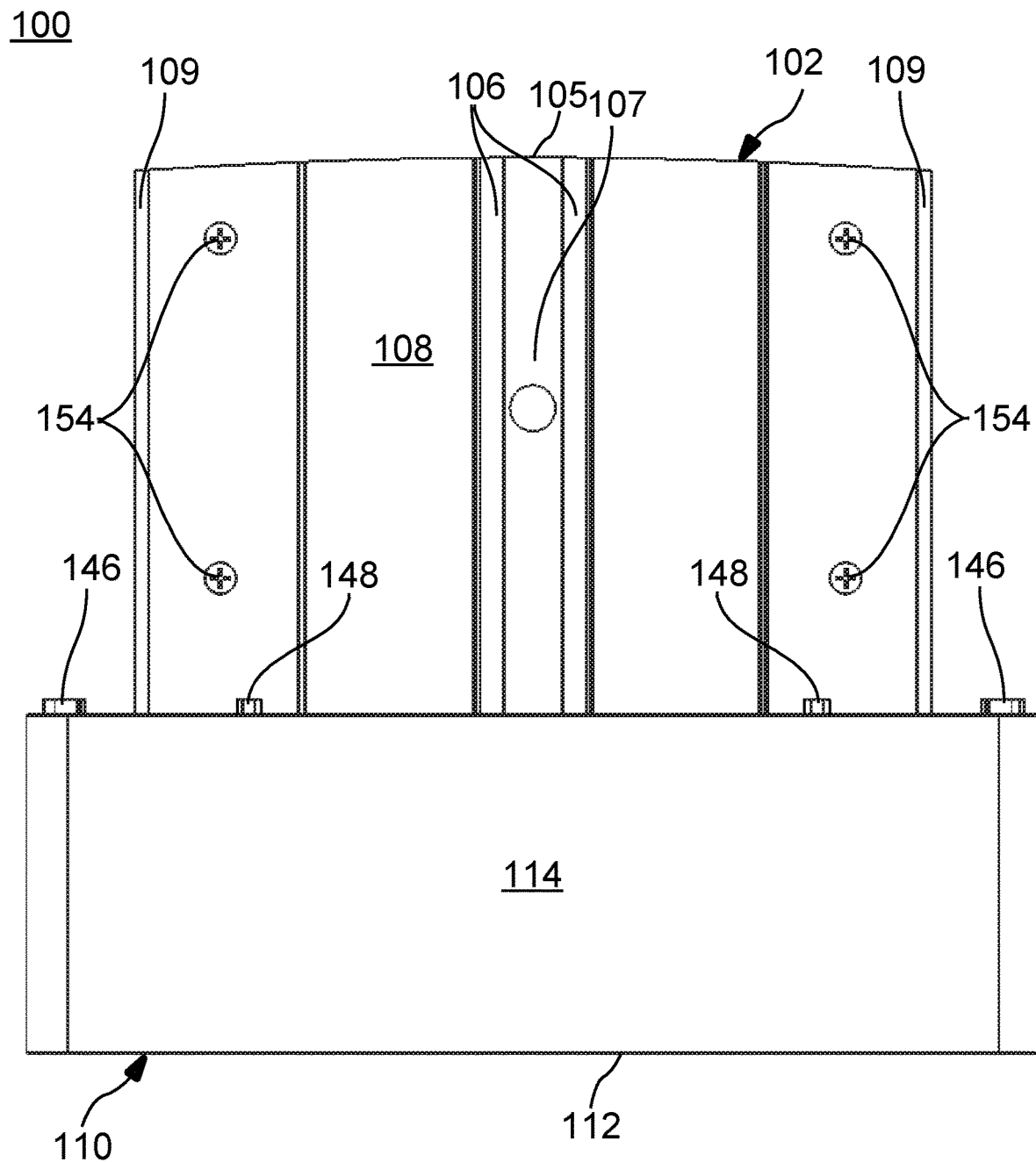

FIG. 14 is a plan view of the camera mount of FIG. 1 when affixed to a ceiling.

Figure 15:
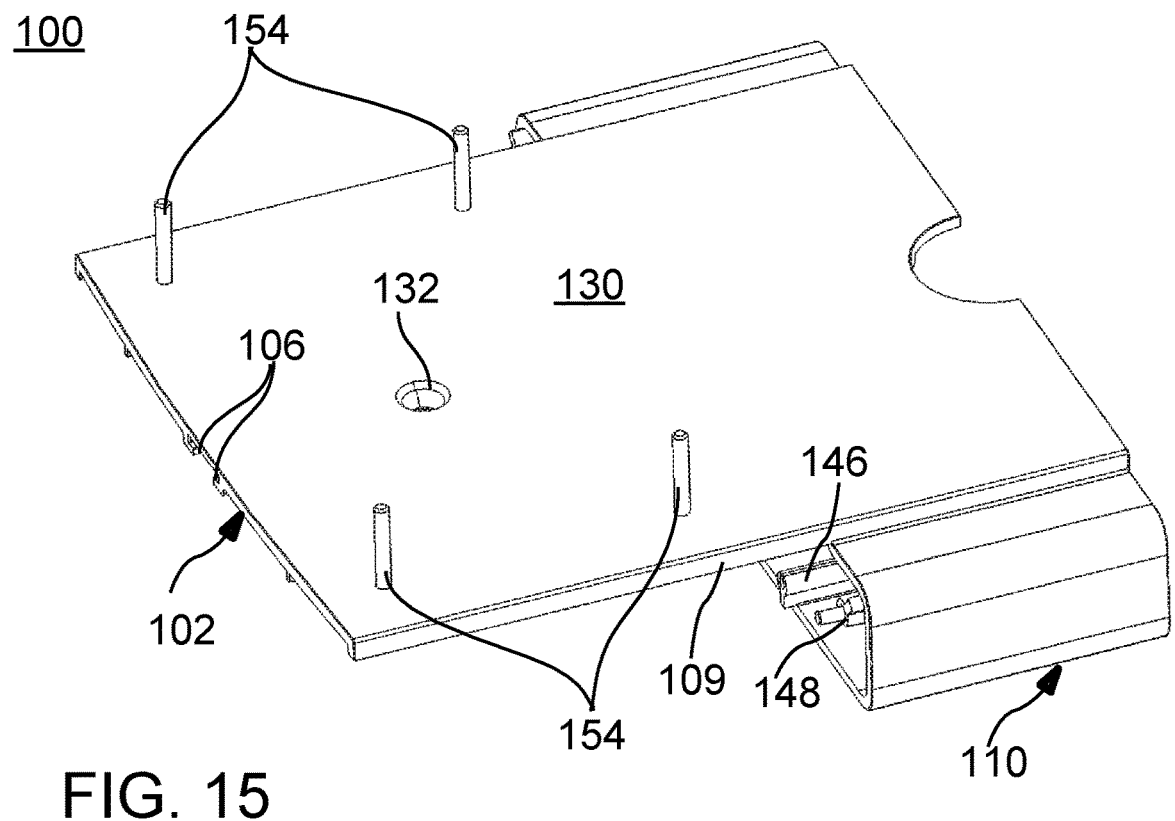
Figure 16:
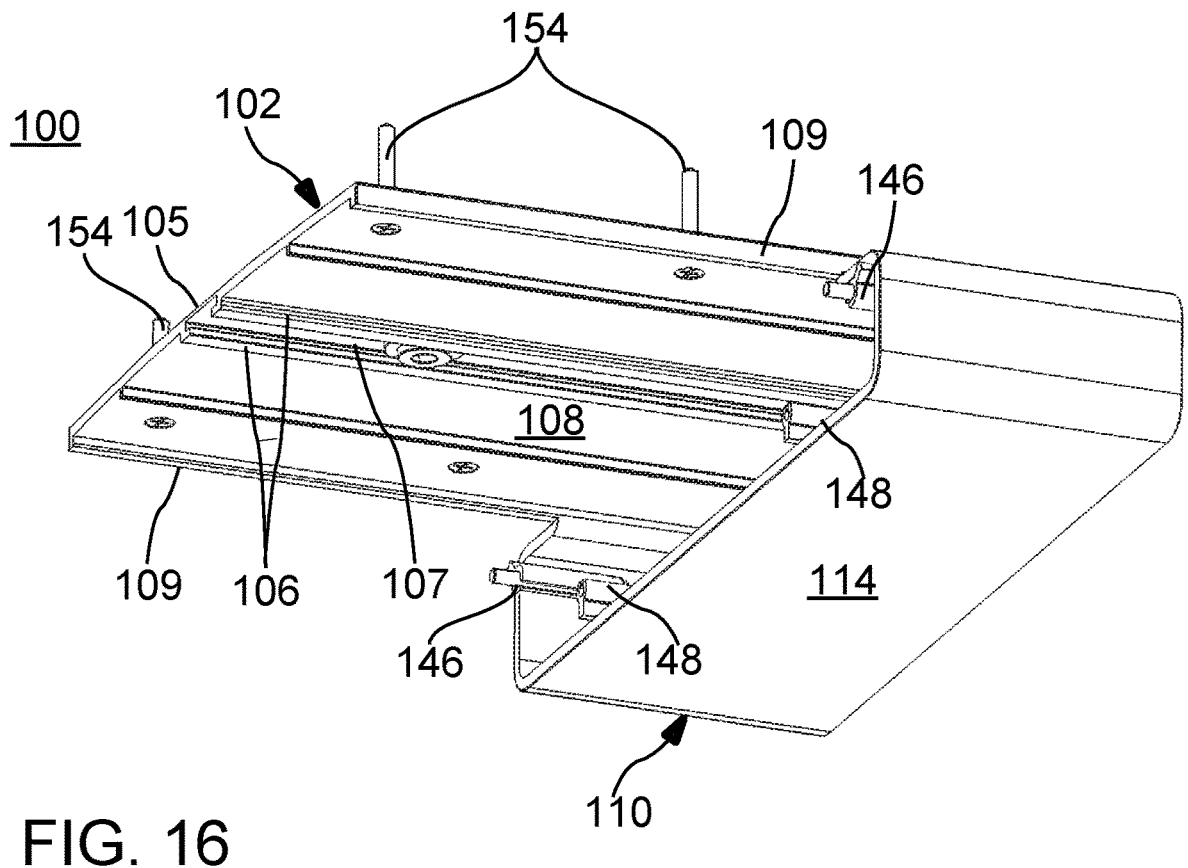

FIGS. 15 and 16 are perspective views of the camera mount of FIG. 14.

Figure 17:
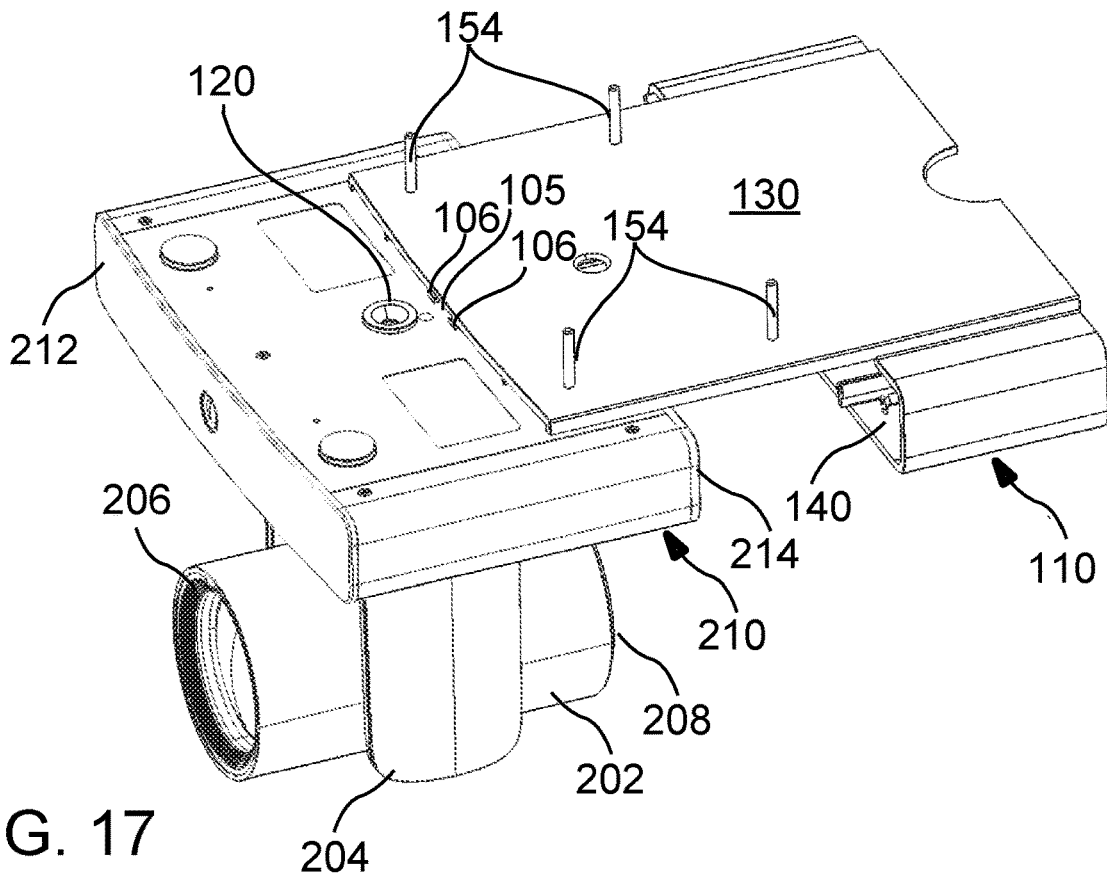

FIG. 17 is a perspective view of the camera mount of FIG. 14 with the know camera partially inserted into the camera mount.

Figure 18:
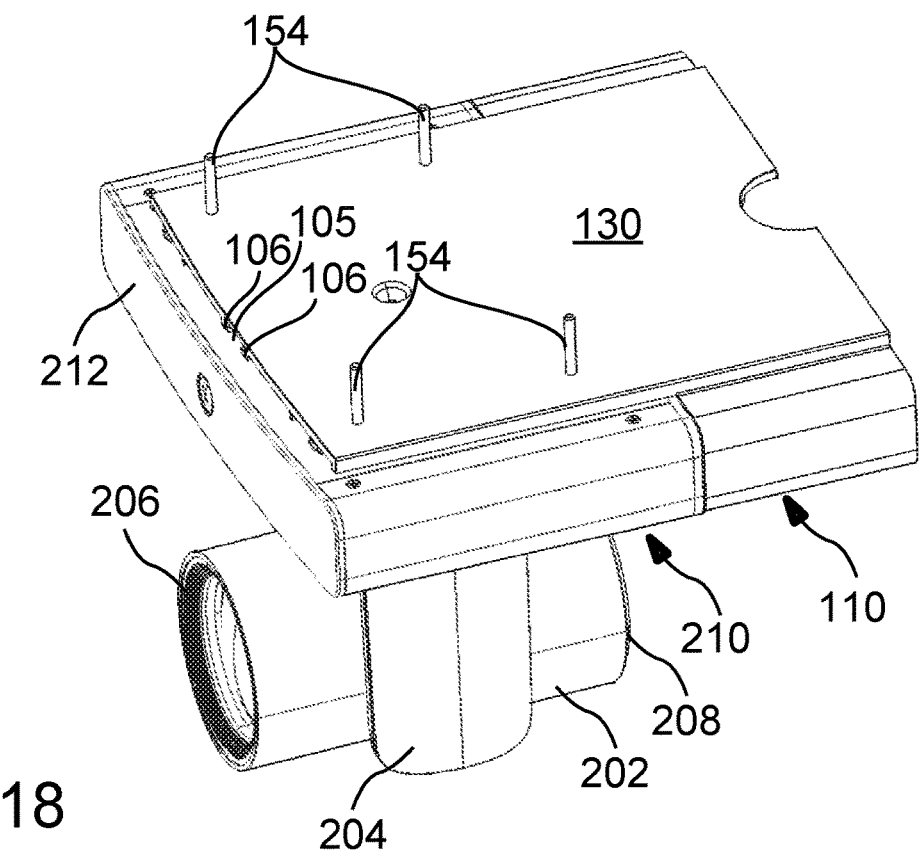

FIG. 18 is a perspective view of the camera mount of FIG. 14 with the known camera fully inserted into the camera mount.

Figure 19:
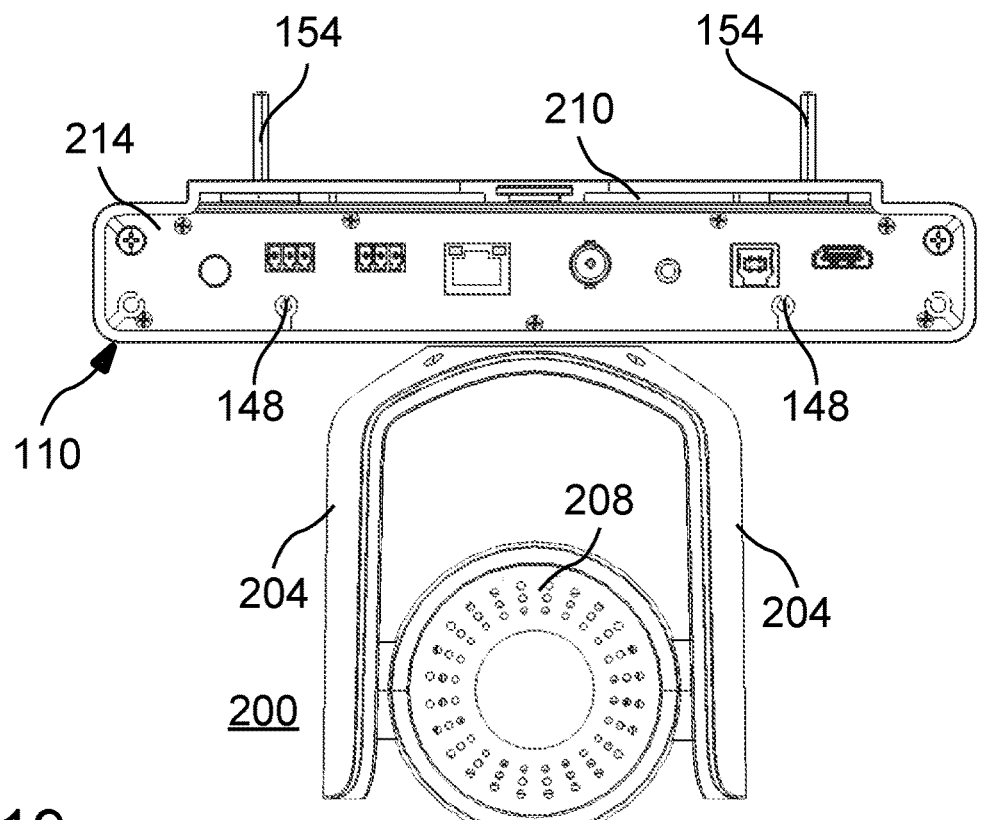

FIG. 19 is a rear elevation view of the camera mount of FIG. 18.

Figure 20:
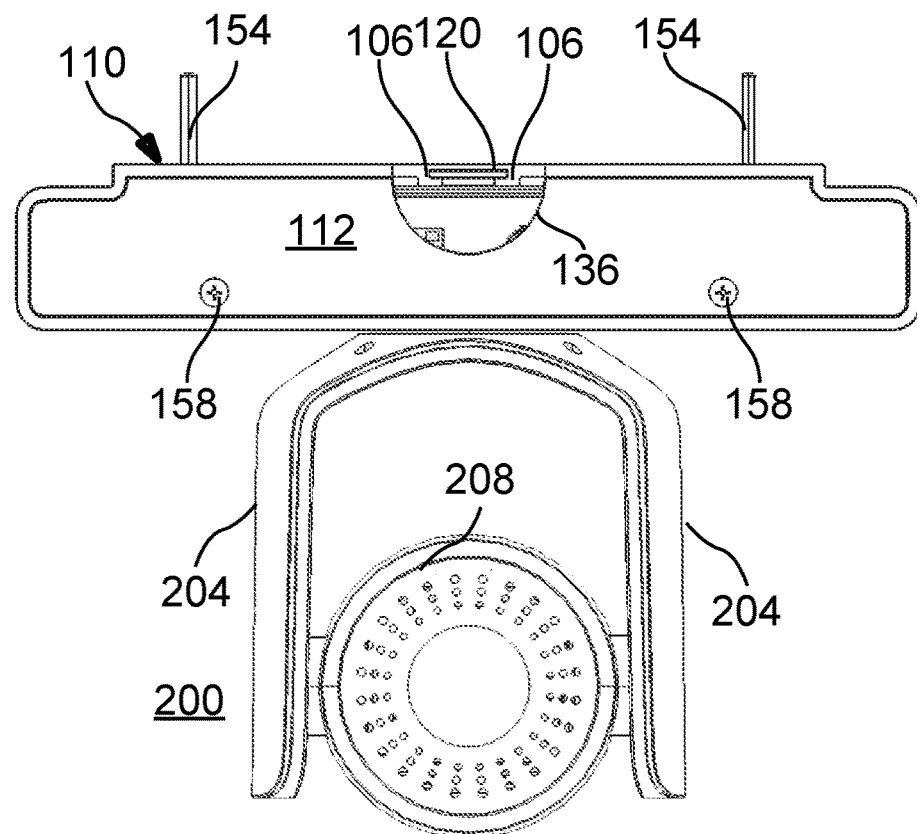

FIG. 20 is another rear elevation view of the camera mount of FIG. 18.

Figure 21:
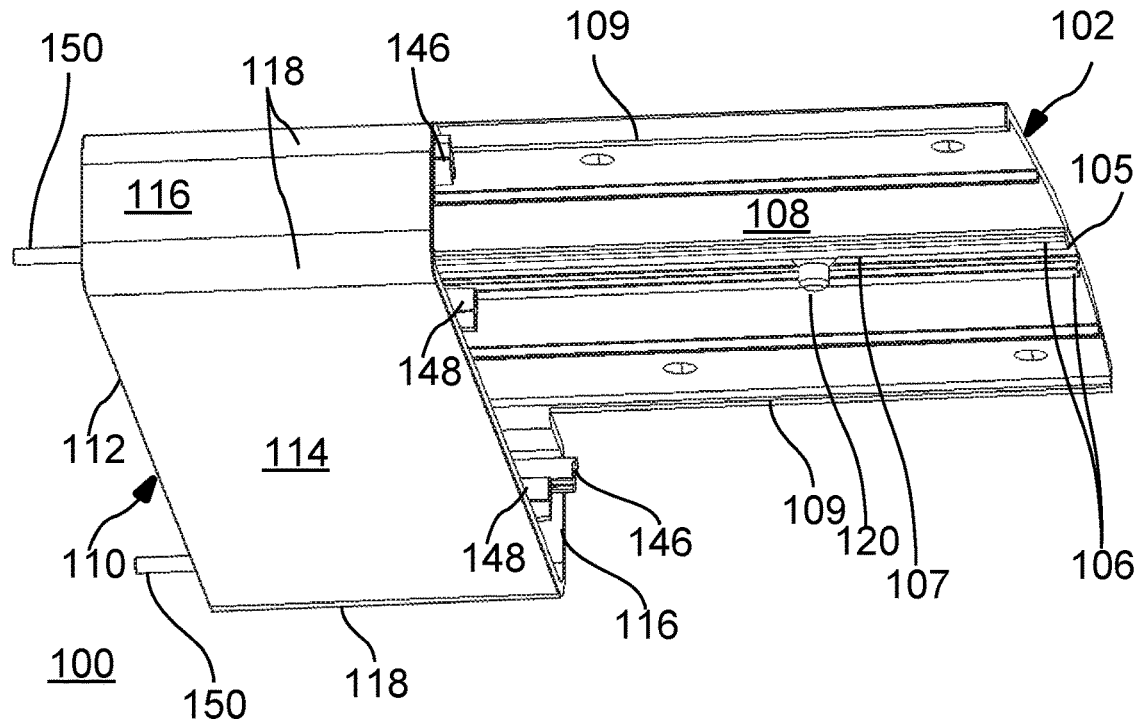
Figure 22:
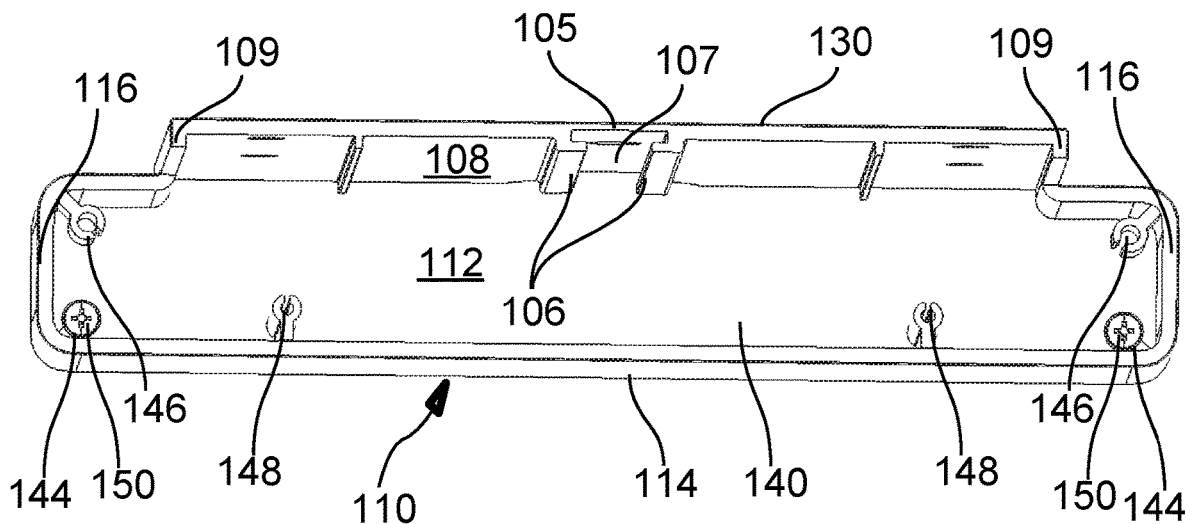

FIG. 21 is a perspective view of the camera mount of FIG. 1 when affixed to a wall in an inverted orientation FIG. 22 is a frontal perspective view of the camera mount of FIG. 21.

Figure 23:
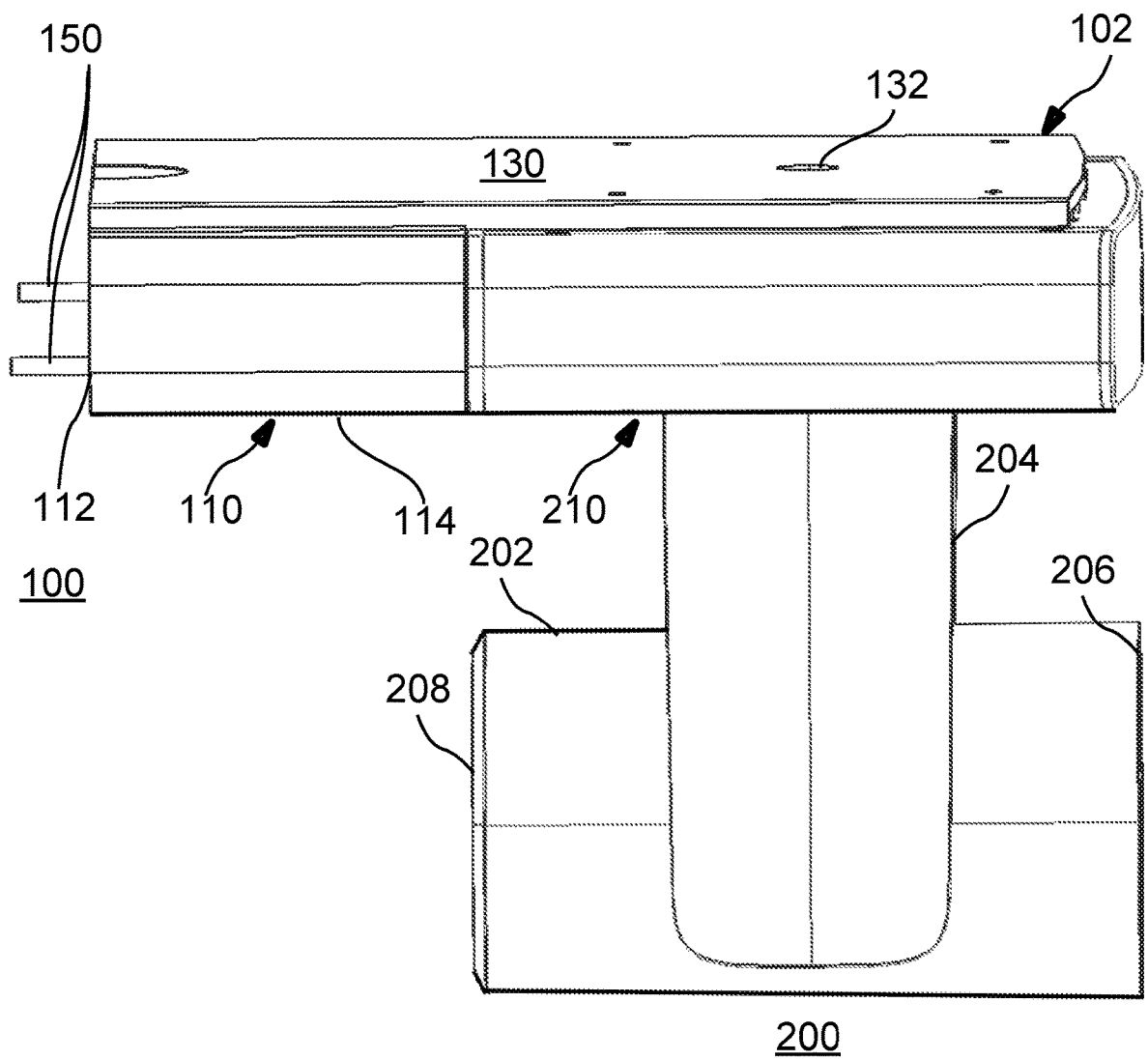

FIG. 23 is a perspective view of the camera mount of FIG. 21 with the known camera mounted thereon.

DETAILED DESCRIPTION OF THE INVENTION

The present embodiments provide a camera mount suitable for attaching either to a wall or a ceiling and for mounting the camera in any of a plurality of orientations.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

LIST OF REFERENCE NUMBERS FOR THE MAJOR ELEMENTS IN THE DRAWING

The following is a list of the major elements in the drawings in numerical order.
100 Camera Mount
102 Platform Part
104 Screw Holes
105 Track Opening
106 Inner Rails
107 Guide Slot
108 Mounting Surface
109 Outer Rails
110 Enclosure Part
112 Back Cover Plate
114 Cover Surface
116 Side Surfaces
118 Rounded Corners
120 Button/Knob
130 Opposite Surface
132 Opening
134 Cut-out
140 Opening in Enclosure Part
144 Hollow Bosses
146 Hollow Bosses
148 Hollow Bosses
149 Threaded Screw or Bolt
150 Threaded Screw
152 Camera Base Screw or Bolt
154 Threaded Screws
200 Camera
202 Camera Body
204 Camera Support
206 Lens End of Camera Body
208 Back Cover of Camera Body
210 Camera Base Enclosure
212 Base Faceplate
214 Rear Plate
217 Tracks
218 Rounded Corners
220 Threaded Tripod Opening

MODE(S) FOR CARRYING OUT THE INVENTION

The embodiment described herein in the context of a camera mount, but is not limited thereto, except as may be set forth expressly in the appended claims.

FIGS. 1-8 are various views of a camera mount 100 in accordance with an embodiment. Specifically, FIGS. 1 and 2 are perspective views of the camera mount 100, FIGS. 3 and 4 are plan views of the camera mount 100, FIGS. 5 and 6 are side elevation views of the camera mount 100, FIG. 7 is a front rear elevation view of the camera mount 100, and FIG. 8 is a rear elevation view of the camera mount 100.

Referring first to FIG. 1, a perspective view of the camera mount 100 in an upright orientation is shown. Namely, FIG. 1 shows an upward facing side of the camera mount 100 when the camera mount 100 is in the upright orientation.

The camera mount 100 includes platform part 102 and an enclosure part 110. The platform part 102 includes a mounting surface 108 upon which a camera may be mounted. The mounting surface 108 includes a plurality of screw holes 104 through which threaded screws may be driven to affix the platform part 102 to an external surface. A pair of inner rails 106 combine to define a guide slot 107 having an opening 105 disposed at a front end of the camera mount 100. The opening 105 is configured to receive a knob 120 that is typically affixed to a camera (not shown). The slot 107 is further configured to guide the knob 120 as it traverses along the slot 107. A pair of side rails 109 may also be provided.

The enclosure part 110 encloses an opening 140 and includes a cover surface 114 and a pair of side surfaces 116. At the intersection of the cover surface 114 and each of the side surfaces 116, the enclosure part 110 may include rounded corners 118 which may be configured to match the shape of a camera base. Other rounded corners 118 may also be provided at a bottom edge of each of the side surfaces 116. A back cover plate 112 may also be attached at a rear end of the housing 110.

FIG. 2 is another perspective view of the camera mount 100 in the upright orientation of FIG. 1. Namely, FIG. 2 shows a downward facing side of the camera mount 100 when the camera mount 100 is in the upright orientation. In FIGS. 1 and 2, as in all subsequent figures, like reference numerals refer to like elements.

As FIG. 2 shows, the platform part 102 includes a opposing surface 130 that is on a side opposite to the mounting surface 108 of the mounting plate 102. A through opening 132 is provided in the opposing surface 130 for receiving a threaded mounting screw or bolt. The threaded screw or bolt may employed to secure a camera (not shown) to the mounting surface 108 of the platform part 102. The threaded end of the screw or bolt is inserted into the opening 132 on the opposing surface 130 side of the platform part 102 and is turned until a head of the threaded screw or bolt presses against the opposing surface 130. The mounting screw or bolt thus secures the camera to the platform part 102 at, for example, a base of the camera.

A cut-out portion 134 may also be provided at the end of the opposing surface 130.

FIG. 3 is a plan view of the camera mount 100 showing the mounting surface 108 of the platform part 102 and the cover surface 114 of the enclosure part 110. Namely, FIG. 3 shows the upward facing side of the camera mount 100 when the camera mount 100 is in the upright orientation.

FIG. 4 is another plan view of the camera mount 100 showing the opposing surface 130 of the platform part 102. That is, FIG. 4 shows the downward facing side of the camera mount 100 when the camera mount 100 is in the upright orientation.

FIGS. 5 and 6 are side elevation views of the camera mount 100 in the upright orientation of FIG. 1.

FIG. 7 is a front elevation view of the camera mount 100 in the upright orientation of FIG. 1. Extending from the inner surface of the enclosure are pairs of cylindrical protrusions or tubes, also known as bosses 144, 146, 148, which run at least part way through the depth of the enclosure. Each of the bosses 144, 146, 148 is hollow and has an opening that runs the along the depth of that boss. The opening in each of the bosses 144, 146, 148 serves as a guide or screw hole through which a threaded screw may be received. As an example, the pair of bosses 144 may have openings to receive threaded screws which are then driven into an external surface, such as a wall, to attach the rear end of the enclosure 110 to the wall or other external surface and thereby affix the mounting bracket 100 to the wall or other external surface. The openings in another pair of bosses 146 may receive threaded screws or bolts to secure the enclosure to a camera mounted to the camera mount 100. A further pair of bosses 148 have openings that may receive threaded screws or bolts to attach a back plate 112 to the enclosure 110. The back plate 112 may be employed to cover the rear end of the enclosure 110 when no threaded screws are present in the openings in bosses 144 and 146, namely, when the rear end of the enclosure 110 is not affixed to an external surface.

FIG. 8 is a rear elevation view of the camera mount 100 showing the camera mount 100 in the upright orientation. FIG. 8 shows the back plate 112 secured to the rear end of the enclosure 110 using threaded screws or bolts 149 which are driven into the openings in bosses 148 shown in FIG. 7.

FIG. 9 is a perspective view of the camera mount 100 with the camera mount 100 in the upright orientation as in FIG. 1. Here, however, at least two threaded screws 150 have been driven through the openings in bosses 144 and extend outward from the enclosure 110. The threaded screws 150 are used to secure the rear end of the enclosure to, for example, a wall or other vertical surface. Though depicted in FIG. 9 for illustrative purposes, the threaded screws 150 are ordinarily hidden by the wall or other vertical surface to which the camera mount is affixed.

FIG. 10 is a front end perspective view of the camera mount 100 showing the heads of the threaded screws 150 which have been driven through the openings in bosses 144.

FIG. 11 is a bottom-rear perspective view of a known camera 200, such as may be mounted to the camera mount 100. The camera 200 includes a camera body 202, a base enclosure 210, and a pair of base supports 204 by which the camera body 202 is attached to the base enclosure 210. The camera body 202 typically encloses the optical elements of the camera 200 at a lens end (not shown). The camera body 202 may also enclose other elements of the camera 200 and includes a back cover 208.

The base enclosure 210 of the camera 200 typically encloses some or all of the electronic circuitry of the camera 200. The base enclosure 210 includes a face plate 212 at one end and a rear plate 214 at an opposing end. The rear plate 214 of the camera base enclosure 210 may include various data ports or other types of ports for receiving connectors.

Tracks 217 may also be provided which may abut against the outer rails 109 on the mounting surface 108 of the camera mount 100 to further guide the camera while the camera 200 is moved into position on the camera mount 100, such as while the knob 120 is guided along the slot 107.

The base enclosure 210 also includes a threaded opening 220, which may be a tripod opening. The threaded opening 220 may be configured to receive the threaded mounting screw or bolt described in connection with FIG. 2. For example, when the camera mount 100 is affixed to the wall or other vertical surface in the upright orientation, the camera 200 is mounted upright atop the mounting surface 108 of the platform part 102, and the threaded mounting screw or bolt may be driven through the opening 132 of the platform part 102 into the threaded opening 220 of the base enclosure 210. Thus, the threaded mounting screw or bolt serves to secure the base enclosure 210 of the camera 200 to the platform part 102 of the camera mount 100.

The base enclosure 210 may also have rounded corners 218 that are matched to the rounded corners 118 of the enclosure 110 of the camera mount 100. Alternatively, the base enclosure 210 may have another shape that matches an alternative shape (not shown) of the enclosure 110 of the camera mount 100.

FIGS. 12 and 13 are perspective views of the camera mount 100 showing a camera mounted to the camera mount 100, such as using the known camera 200 of FIG. 11. The camera mount 100 is further affixed to the wall or other vertical external surface while in the upright orientation. As in FIG. 9, the threaded screws 150 protruding from the camera mount 100 are depicted here for illustrative purposes but are ordinarily hidden by the wall or other vertical surface to which the camera mount is affixed.

The camera 200 is mounted to the camera mount 100 also in an upright orientation. That is, a bottom surface of the base enclosure 210 is disposed atop the mounting surface 108 of the platform part 102. Additionally, the rear plate 214 of the base enclosure 210 abuts against the opening 140 in the enclosure part 110.

A threaded mounting screw or bolt 152 secures the camera 200 to the camera mount 100 by its threaded end being inserted into opening 132 in the surface 130 of the platform part 102 and then being driven into a threaded opening in the bottom of the base enclosure 210 of the camera 200, such as the threaded tripod opening 220, to hold the camera 200 against the platform part 102.

FIGS. 14-20 depict an alternative arrangement of the camera mount 100 in which the camera mount 100 is affixed to an overhead horizontal surface, such as a ceiling, while the camera mount is in an inverted orientation.

FIG. 14 is a plan view of the inverted camera mount 100 showing the mounting surface 108 of the platform part 102 and the cover surface 114 of the enclosure part 110. Namely, FIG. 14 shows the downward facing side of the camera mount 100 when the camera mount 100 is in the inverted orientation.

A plurality of threaded screws, such as the four threaded screws 154, are driven through the openings 104 in the mounting surface 108 of the platform part 102 and then into a ceiling or other overhead surface to affix the platform part 102 to the ceiling or other overhead surface. Typically, when the platform part is affixed 102 to the ceiling or other overhead surface, the opposing surface 130 contacts the ceiling or other overhead surface. FIG. 14 shows the heads of the threaded screws 154 after being driven into the ceiling or other overhead surface.

FIG. 15 is a perspective view of the inverted camera mount 100 showing the upward facing side of the camera mount 100 and showing the opposing surface 130 of the platform part 102. The threaded screws 154, shown protruding from the opposing surface 130, are depicted here for illustrative purposes. Ordinarily, the threaded ends of the threaded screws 154 are hidden behind the ceiling or other overhead surface.

FIG. 16 is a perspective view of the inverted camera mount 100 showing the downward facing side of the camera mount 100 and showing the mounting surface 108 of the platform part 102 and the cover surface 114 of the enclosure part 110. As in FIG. 15, the threaded screws 154 are shown in FIG. 16 for illustrative purposes and would normally be hidden behind the ceiling or other overhead surface.

FIGS. 17 and 18 show the manner in which a camera, such as the known camera 200, is mounted to the camera mount 100. Here, the camera 200 is in an inverted orientation while being mounted to the inverted camera mount 100 that is attached to the ceiling of other overhead surface.

To support the camera 200, a knob 120 is employed. The knob 120 has an integral threaded screw or bolt (not shown) that may be driven into the threaded tripod opening 220, or into another threaded opening, in the base enclosure 210 of the camera 200. As FIG. 17 shows, the camera 200 is first inserted into the camera mount 100 by inserting the knob 120 into the opening 105 at the front end of the slot 107.

Then, the camera 200 is translated along the mounting surface 108 toward the enclosure part 110 while the slot 107 guides the movement of the knob 120. The camera 200 is further moved until the rear plate 214 of the base enclosure 210 abuts against the enclosure part 110, as shown in FIG. 18.

FIG. 19 is a rear elevation view of the inverted camera mount 100 with the inverted camera 200 held by the camera mount. As in FIGS. 15-18, the threaded screws 154 are shown for illustrative purposes and would normally be hidden behind the ceiling or other overhead surface. The rear plate 214 of the camera base enclosure 210 is visible through the opening in the rear of the enclosure part 110 and shows various ports which may be employed.

FIG. 20 is another rear elevation view of the camera mount 100 and camera 200 as in FIG. 19 but showing the back cover plate 112 secured to the rear of the enclosure part 110. The heads of the threaded screws or bolts 158 are shown having been driven into the openings in bosses 148 of the enclosure part 110. A cutout 136 is present in the back cover plate 112 and provides an opening through which cables may pass and connect to the ports located on the rear plate 214 of the camera base enclosure 210.

FIGS. 21-23 shows a further alternative arrangement of the camera mount 100 in which the camera mount 100 is affixed to the wall or other vertical surface in an inverted orientation.

FIG. 21 is a perspective view of the inverted camera mount 100 showing the side having the mounting surface 108 of the platform part 102 and the cover surface 114 of the enclosure part 110. Namely, FIG. 21 shows the downward facing side of the camera mount 100 when the camera mount 100 is in the inverted orientation.

At least two threaded screws 150 are shown driven through the openings in bosses 144 and extending outward from the enclosure part 110. The threaded screws 150 are used to secure the end of the enclosure part 110 to the wall or other vertical surface. The threaded screws 150 are depicted here for illustrative purposes and, ordinarily, are hidden by the wall or other vertical surface to which the camera mount is affixed.

FIG. 22 is an end perspective view of the inverted camera mount 100. The heads of the threaded screws 150 are shown having been driven through the openings in bosses 144.

FIG. 23 is a perspective view showing a known camera, such as the camera 200 of FIG. 11, mounted to the inverted camera mount 100 with the camera mount 100 affixed to the wall or other vertical external surface. As in FIG. 21, the threaded screws 150 are depicted for illustrative purposes but are ordinarily hidden by the wall or other vertical surface to which the camera mount is affixed.

The camera 200 is mounted to the camera mount 100 in the inverted orientation. That is, the base enclosure 210 is disposed below the mounting surface 108 of the platform part 102. Further, the rear plate 214 of the base enclosure 210 abuts against the enclosure part 110.

To hold the camera 200 in the camera mount 100, the camera is mounted in a manner similar to that described in connection with FIGS. 17 and 18. That is, the knob 120, which is secured to the camera 200, is first inserted into the opening 105 at the front end of the slot 107. The camera 200 is then moved along the mounting surface 108 toward the enclosure part 110 using the slot 107 to guide the movement of the knob 120 and thus the movement of the camera 200. The side rails 109 may also be used to guide the tracks 217 of the camera base 210 while the camera is being inserted.

The camera 200 is further moved until the rear plate 214 of the base enclosure 210 abuts the enclosure part 110.

Accordingly, the present embodiments provide a camera mount suitable for being attached to each of (a) a wall or other vertical surface while the camera mount is in an upright orientation, (b) the wall or other vertical surface while the camera mount is in inverted, and (c) a ceiling or other horizontal overhead surface the camera mount is in the inverted orientation.

Further, the present embodiments provide a camera mount suitable for (a) mounting a camera in an upright orientation to the camera mount while the camera mount is attached to the wall or other vertical surface in the upright orientation, (b) mounting a camera in an inverted orientation to the camera mount while the camera mount is attached to the wall or other vertical surface in the inverted orientation, as well as (c) mounting a camera in an inverted orientation to the camera mount while the camera mount is attached to the ceiling or other horizontal overhead surface in the inverted orientation.

By providing a camera mount that is capable of being attached to a wall or ceiling and that is capable of mounting a camera in either an upright or inverted orientation, the present embodiments permit a single camera mount to be used, thereby providing flexibility and reducing costs and inventory.

INDUSTRIAL APPLICABILITY

To solve the aforementioned problems, the present embodiments provide a camera mount suitable for mounting a camera either to a wall or a ceiling and for mounting the camera in either an upright orientation or inverted orientation.

It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described as being in particular combinations, each feature or element may be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that may be derived from the description contained herein by a person skilled in the art. No element, act, or instruction used in the description of the present application should be construed as critical or essential to the embodiments unless explicitly described as such. Also, as used herein, the article "a" is intended to include one or more items.

In addition, the above disclosed methods are not meant to limit the aspects of the embodiments, or to suggest that the aspects of the embodiments should be implemented following the aforementioned methods. The purpose of the aforementioned methods is to facilitate the understanding of one or more aspects of the embodiments and to provide the reader with one or many possible implementations of the processed discussed herein. It should be understood by one of ordinary skill in the art that the steps of the aforementioned methods may be performed in a different order and that some steps may be eliminated or substituted.

All United States patents and applications, foreign patents, and publications discussed above are hereby incorporated herein by reference in their entireties.

ALTERNATE EMBODIMENTS

Alternate embodiments may be devised without departing from the spirit or the scope of the embodiments.

What is claimed is:

1. A bracket for mounting a device to any of a plurality of surfaces at any of a plurality of orientations, the bracket comprising:
    (a) a platform part having a mounting surface configured to support the device;
    (b) an end part located at one end of the platform part, the end part having a plurality of tubular bosses configured to receive threaded screws by which the end part is fastened to a first external surface when the bracket is in a first orientation;
    (c) the mounting surface of the platform part having a plurality of openings configured to receive threaded screws by which the platform part is alternatively fastened to a second external surface when the bracket is in a second orientation different than the first orientation; and
    (d) a guide slot formed in the mounting surface of the platform part, the guide slot having an open end that faces away from the end part, the guide slot being configured to, when the bracket is in the second orientation, receive through the open end a knob secured to the device, then guide the knob along the guide slot as the device is moved toward the end part, and thereafter retain the knob and thereby hold the device.

2. The bracket of claim 1, wherein
    (a) when the bracket is in the first orientation, the mounting surface faces upward and is configured to receive the device atop the mounting surface.

3. The bracket of claim 1, wherein
    (a) when the bracket is in the first orientation, the mounting surface is configured to receive the device in an upright position.

4. The bracket of claim 1, wherein
    (a) when the bracket is in the second orientation, the mounting surface faces downward.

5. The bracket of claim 1, wherein
    (a) when the bracket is in the second orientation, the guide slot is oriented to receive the device in an inverted position.

6. The bracket of claim 1, wherein
    (a) the platform part includes a further surface having a further opening configured to receive a further threaded screw by which, when the bracket is in the first orientation, the device is secured to the platform part.

7. The bracket of claim 1, wherein
(a) the end part is further configured to be fastened to the first external surface when the bracket is in the second orientation, without the platform part being fastened to the second external surface, the plurality of tubular bosses in the end part of the bracket receiving the threaded screws by which the end part is fastened to the first external surface,
(b) the guide slot of the platform part receiving, guiding and retaining the knob secured to the device in a same manner as when the platform part is fastened to the second external surface.

8. The bracket of claim 1, wherein the end part comprises
(a) an enclosure part that encloses an end portion of the platform part.

9. The bracket of claim 8, wherein
(a) each one of the plurality of the tubular bosses extends from, and is supported by, the enclosure part.

10. camera mount for mounting a camera to any of a plurality of surfaces at any of a plurality of orientations, the camera mount comprising:
(a) a platform part having a mounting surface configured to support the camera;
(b) an end part located at one end of the platform part, the end part having a plurality of tubular bosses configured to receive threaded screws by which the end part is fastened to a first external surface when the camera mount is in a first orientation;
(c) the mounting surface of the platform part having a plurality of openings configured to receive threaded screws by which the platform part is alternatively fastened to a second external surface when the camera mount is in a second orientation different than the first orientation; and
(d) a guide slot formed in the mounting surface of the platform part, the guide slot having an open end that faces away from the end part, the guide slot being configured to, when the camera mount is in the second orientation, receive through the open end a knob secured to the camera, then guide the knob along the guide slot as the camera is moved toward the end part, and thereafter retain the knob and thereby hold the camera.

11. The camera mount of claim 10, wherein
(a) when the camera mount is in the first orientation, the mounting surface faces upward and is configured to receive the camera atop the mounting surface.

12. The camera mount of claim 10, wherein
(a) when the camera mount is in the first orientation, the mounting surface is configured to receive the camera in an upright position.

13. The camera mount of claim 10, wherein
(a) when the camera mount is in the second orientation, the mounting surface faces downward.

14. The camera mount of claim 10, wherein
(a) when the camera mount is in the second orientation, the guide slot is oriented to receive the camera in an inverted position.

15. The camera mount of claim 10, wherein
(a) the platform part includes a further surface having a further opening configured to receive a further threaded screw by which, when the camera mount is in the first orientation, the camera is secured to the platform part.

16. The camera mount of claim 10, wherein
(a) the end part is further configured to be fastened to the first external surface when the camera mount is in the second orientation, without the platform part being fastened to the second external surface, the plurality of tubular bosses in the end part of the camera mount receiving the threaded screws by which the end part is fastened to the first external surface,
(b) the guide slot of the platform part receiving, guiding and retaining the knob secured to the camera in a same manner as when the platform part is fastened to the second external surface.

17. The camera mount of claim 10, wherein the end part comprises
(a) an enclosure part that encloses an end portion of the platform part.

18. The camera mount of claim 17, wherein
(a) the enclosure part has a shape that conforms to a shape of a base portion of the camera.

19. The camera mount of claim 17, wherein the end part further comprise
(a) an end plate affixable to an end of the enclosure part.

20. The camera mount of claim 17, wherein
(a) each one of the plurality of the tubular bosses extends from, and is supported by, the enclosure part.

21. camera mount for mounting a camera to a wall or a ceiling at an upright or an inverted orientation, the camera mount comprising:
(a) a platform part having a mounting surface configured to support the camera;
(b) an enclosure part located at one end of the platform part and enclosing a portion of the platform part, the enclosure part having a shape that conforms to a shape of a base portion of the camera, the enclosure part having a plurality of tubular bosses in an end portion of the enclosure part that are configured to receive threaded screws by which the end portion is fastened to a wall when the camera mount is in the upright orientation, each one of the plurality of tubular bosses extending from, and being supported by, the enclosure part;
(c) the platform part including a further surface having a further opening configured to receive a further threaded screw by which, when the camera mount is in the upright orientation, the camera is secured to the platform part;
(d) the mounting surface of the platform part having a plurality of openings that are configured to receive threaded screws by which the platform part is alternatively fastened to the ceiling when the camera mount is in the inverted orientation;
(e) a guide slot formed in the mounting surface of the platform part, the guide slot having an open end that faces away from the enclosure part, the guide slot being configured to, when the camera mount is in the inverted orientation, receive through the open end a knob secured to the camera, then guide the knob along the guide slot as the camera is moved toward the enclosure part, and thereafter retain the knob and thereby hold the camera; and
(f) an end plate affixable to an end of the enclosure part;
wherein (g)
(1) the enclosure part is further configured to be fastened to the wall when the camera mount is in the inverted orientation, without the platform part being fastened to the ceiling, the plurality of tubular bosses in the enclosure part of the camera mount receiving the threaded screws by which the enclosure part is fastened to the wall, (2) the guide slot of the platform part receiving, guiding and retaining the knob secured to the camera in a same manner as when the platform part is fastened to the ceiling.

* * * * *